US012676576B2

(12) United States Patent
Shen et al.

(10) Patent No.: US 12,676,576 B2
(45) Date of Patent: Jul. 7, 2026

(54) VENTILATION STRUCTURE FOR BIPV MODULES

(71) Applicants: CNBM RESEARCH INSTITUTE FOR ADVANCED GLASS MATERIALS GROUP CO., LTD., Bengbu (CN); TRIUMPH SCIENCE & TECHNOLOGY GROUP CO., LTD., Beijing (CN)

(72) Inventors: Yilei Shen, Schwetzingen (DE); Nan Chen, Erlangen (DE)

(73) Assignees: CNBM RESEARCH INSTITUTE FOR ADVANCED GLASS MATERIALS GROUP CO., LTD., Bengbu (CN); TRIUMPH SCIENCE & TECHNOLOGY GROUP CO., LTD., Beijing (CN)

( * ) Notice: Subject to any disclaimer, the term of this patent is extended or adjusted under 35 U.S.C. 154(b) by 16 days.

(21) Appl. No.: 18/932,244

(22) Filed: Oct. 30, 2024

(65) Prior Publication Data

US 2025/0055417 A1     Feb. 13, 2025

Related U.S. Application Data

(63) Continuation of application No. PCT/CN2023/083022, filed on Mar. 22, 2023.

(51) Int. Cl.
*H02S 40/42*          (2014.01)
*E04B 2/88*          (2006.01)
*H02S 20/22*          (2014.01)

(52) U.S. Cl.
CPC ............ *H02S 40/425* (2014.12); *H02S 20/22* (2014.12); *E04B 2/88* (2013.01)

(58) Field of Classification Search
CPC .......... H02S 20/22; H02S 20/26; H02S 40/42; H02S 40/425; E04B 2/88; F24S 20/60–67; F24S 2005/0064; F24S 2005/0067
See application file for complete search history.

(56) References Cited

U.S. PATENT DOCUMENTS

2013/0167908 A1 *    7/2013   Yang ........................ H02S 30/10
                                                                    136/251
2015/0034145 A1      2/2015   Fujimura
2015/0155826 A1 *    6/2015   Masaryk ................. H02S 40/44
                                                                    136/244

FOREIGN PATENT DOCUMENTS

CN          101565974 A      10/2009
CN          202647966 U       1/2013
                    (Continued)

OTHER PUBLICATIONS

JP-H10159201-A English machine translation (Year: 1998).*
                    (Continued)

*Primary Examiner* — Andrew J Golden

(57)          ABSTRACT

The present invention relates to a novel ventilation structure for BIPV modules, which comprises photovoltaic modules matched with a building wall, the back of the photovoltaic modules is installed on the facade of the building wall in parallel through a plurality of steel columns, a ventilation gap is formed between the photovoltaic modules and the building wall, an air inlet passage for forming a constricted air inlet is transversely inserted in the bottom of the ventilation gap, and an air outlet chimney as an air outlet is longitudinally inserted in the top of the ventilation gap. The air duct between the photovoltaic modules and the building wall is modified, the natural convection in the ventilation gap can be accelerated to a high wind speed level similar to that of forced convection without requiring any mechanical (Continued)

3
2
4
1 fan device, enhancing the ventilation cooling of the BIPV modules without increasing power consumption.

16 Claims, 19 Drawing Sheets

(56)                    References Cited

FOREIGN PATENT DOCUMENTS

| CN | 103233530 | A | | 8/2013 | | |
| CN | 104060733 | A | | 9/2014 | | |
| CN | 206145888 | U | | 5/2017 | | |
| CN | 206724212 | U | | 12/2017 | | |
| CN | 206724213 | U | | 12/2017 | | |
| CN | 110424530 | A | | 11/2019 | | |
| CN | 111188439 | A | | 5/2020 | | |
| CN | 111664527 | A | | 9/2020 | | |
| CN | 212743071 | U | | 3/2021 | | |
| CN | 112984786 | A | | 6/2021 | | |
| CN | 114244272 | A | * | 3/2022 | ............ | H02S 20/26 |
| CN | 115233877 | A | * | 10/2022 | ................ | F24F 7/06 |
| CN | 217871385 | U | | 11/2022 | | |
| CN | 115522667 | A | | 12/2022 | | |
| EP | 2148136 | A1 | | 1/2010 | | |
| JP | H10159201 | A | * | 6/1998 | ............ | H02S 20/23 |
| JP | 2013008763 | A | | 1/2013 | | |
| KR | 101638419 | B1 | | 7/2016 | | |
| KR | 20210048115 | A | | 5/2021 | | |
| SK | 500512012 | U1 | | 12/2012 | | |
| WO | WO-2020161548 | A2 | * | 8/2020 | ............ | H02S 40/44 |

OTHER PUBLICATIONS

CN-114244272-A English machine translation (Year: 2022).*
CN 212743071U English machine translation (Year: 2021).*
CN 206724213U English machine translation (Year: 2017).*
CN 110424530A English machine translation (Year: 2019).*
CN 115233877A English machine translation (Year: 2022).*
CN 104060733A English machine translation (Year: 2014).*
O C Olawole et al., "Innovative methods of cooling solar panel: A concise review", Journal of Physics: Conf. Series, 2019, vol. 1299, 012020.

* cited by examiner

VENTILATION STRUCTURE FOR BIPV MODULES

CROSS-REFERENCE TO RELATED APPLICATIONS

This application is a continuation of International Patent Application No. PCT/CN2023/083022, filed on Mar. 22, 2023. The content of the aforementioned application, including any intervening amendments made thereto, is incorporated herein by reference in its entirety.

TECHNICAL FIELD

The present invention belongs to the field of Building Integrated Photovoltaic (BIPV) technology, and particularly relates to a novel ventilation structure for BIPV modules.

BACKGROUND

Building Integrated Photovoltaic and application thereof in making building elements, such as facades, into power generation units have rapidly expanded in order to achieve carbon neutrality. This technology achieves not only architectural functions, such as thermal insulation and wind resistance, but also power generation. One embodiment of standard BIPV facade installation is illustrated in FIG. 1(a) and FIG. 1(b). The PV modules 3 are installed in the cladding of a building wall 1 above the ground 4, with a thermal insulation layer 2 arranged in between. As can be seen in FIG. 1(a) and FIG. 1(b), there is no ventilation gap between the installed PV (Photovoltaic) modules and the building wall.

It is well-known that by absorbing light, the photovoltaic module directly converts light energy into electric energy. Thereby, only part of the incident light is converted into electrical energy, while the rest is converted into heat. Thus, when the PV module is heated up during operation, its electricity yield will immediately decrease. This characteristic of the PV modules is described by a temperature coefficient Tk, which indicates a relative change in efficiency or electrical output (in %) as a function of temperature (in K). For various PV modules, the temperature coefficient Tk strongly depends on their types, e.g. $-0.4\%/K$ for Si—PV, $-0.28\%/K$ for CdTe, $-0.08\%/K$ to $-0.18\%/K$ for perovskite, $-0.29\%/K$ to $-0.5\%/K$ for OPV and $-0.24\%/K$ for HJT. For PV modules based on CIGS (Copper Indium Gallium Selenide), a temperature coefficient of approximate $-0.35\%/K$ may usually be reached. For example, as temperature is increased by 60 K, the electricity yield of CIGS BIPV modules is 21% lower than before. Usually, BIPV modules may be easily heated up from room temperature to over 80° C. in summer, even to about 120° C. for very black solar modules at noon. In this way, the temperature of the PV modules has a huge impact on their power conversion efficiency. In the BIPV application, the heating of solar modules typically depends on their specific installation structures and the heat dissipation of the solar modules (including heat dissipation from the front and the back). Therefore, a high level of heating can occur if the heat emitted by the solar modules cannot be sufficiently dissipated due to, for example, no ventilation gap existing between the BIPV modules installed adjacent to the thermal insulation layer on the facade. Therefore, cooling techniques on the PV modules play an important role in maintaining the performance of the whole BIPV system.

Various methods for cooling solar modules have been described in the prior art. In Olawole et al.[1] 2019 J. Phys.: Conf. Ser. 1299 012020, options for cooling solar modules are introduced. Accordingly, an active or passive cooling method may be employed.

The active cooling method relies on a certain mechanical device to pump a liquid or gaseous medium to cool down solar modules installed in a building. However, to this end, it is required to continuously supple additional electric power, so as to operate the mechanical cooling device. Accordingly, the power used in fans or pumps will be deducted from the power generated from the solar modules. As a result, the net electricity yield of the solar modules is reduced.

For passive cooling, there is no additional cooling device for solar panels, so heat is only released to the environment passively. Previous researches on passively cooled PV modules mainly focus on two major methods: use of PCM (phase change material) or natural convection. Regarding cooling by PCM, the PCM is used to cool PV panels by absorbing the heat generated on PV in the daytime. Then, at night, the heat absorbed by the PCM may be released into the environment. However, the use of the PCM is mainly at the research stage, and the consistency between reproducibility and performance remains a problem. Regarding cooling by natural convection, as the name suggests, solar panels are cooled by the natural air. When installed BIPV modules have a ventilation gap 6 between solar panels and a building wall, cooling by natural convection may occur on the front and back of the solar panels. As shown in FIG. 2(a) and FIG. 2(b), the BIPV modules with the standard ventilation gap 6 are installed on a building facade. PV panels are fixed by steel columns 5, instead of a thermal insulation layer 2, on the facade. When an airflow 7 travels towards the building at a certain speed, part of the airflow 7 will flow into the gap 6 and move upwards. Thus, the higher the mass flow or speed of the air is, the more greater temperature decrease on the PV modules may be. However, because the air speed in the ventilation gap 6 will be decreased by various barriers (e.g. the steel columns 5) in the ventilation gap 6, the actual performance of the convective cooling process by the standard ventilation gap will be decreased. As shown in FIG. 6, heat may be accumulated in the middle area of an installed solar module matrix. Therefore, there is a need to modify such a standard ventilation gap design, so as to improve the convective cooling of BIPV modules.

In order to improve the convective cooling of ventilated BIPV modules, some methods in which an additional thin metal plate structure is used on the back of photovoltaic modules to increase the effective heat dissipation area are employed. As can be seen in FIG. 3(a) and FIG. 3(b), sectional or conventional metal plates are installed on the back of solar panels to enhance convective cooling in a ventilation gap. However, this extra and even quite complicated structure will greatly increase the BOM (Bill of Material) cost of each individual BIPV panel. In addition, the installation of such a panel will become more difficult as well, resulting in higher installation cost. Therefore, in addition to the need to modify the standard ventilation gap design to improve the cooling of BIPV, the fixed cost of such modification should also be considered economically.

SUMMARY

Aiming at the defects of the prior art, the present invention provides a novel ventilation structure for BIPV modules, which is intended to enhance the ventilation cooling of the BIPV modules and increase their electricity yield without increasing power consumption and, at the same time, ensure that the fixed cost of modification is low and that installation is easy. The specific technical solution is as follows:

The present invention provides a novel ventilation structure for BIPV modules, comprising photovoltaic modules matched with a building wall, the back of the photovoltaic modules being installed on the facade of the building wall in parallel through a plurality of steel columns, and a ventilation gap being formed between the photovoltaic modules and the building wall, wherein an air inlet passage for forming a constricted air inlet is transversely inserted in the bottom of the ventilation gap, and an air outlet chimney as an air outlet is longitudinally inserted in the top of the ventilation gap.

As a preferred technical solution of the present invention, the length L of the top surface of the air inlet passage is 0.5 m to 2 m, and the height H of an opening of the air inlet passage is 0.2 m to 0.8 m; the width of the ventilation gap is less than 0.08 m, and the ratio of the height of the opening of the air inlet passage to the width of the ventilation gap is 2.5 to 10.

As a preferred technical solution of the present invention, the air inlet passage adopts a parallel structure design.

As a preferred technical solution of the present invention, the bottom surface of the air inlet passage makes an included angle of 20° to 70° with the ground at the bottom of the building wall.

As a preferred technical solution of the present invention, the end surface at the opening of the air inlet passage is sealed with an air inlet grille, which is provided with a plurality of through holes distributed in an array, and the longitudinal section of each through hole is of a flared structure and constricted inward.

As a preferred technical solution of the present invention, an air outlet passage of the air outlet chimney adopts an enlarged air outlet design, and the longitudinal section of the air outlet passage is of a flared structure and constricted inward.

As a preferred technical solution of the present invention, the air outlet passage of the air outlet chimney adopts a half-enlarged air outlet design, and the longitudinal section of the air outlet passage is of a half-flared structure and constricted inward.

As a preferred technical solution of the present invention, a chimney hood which is of a conical structure is suspended over the top opening of the air outlet passage through supports.

As a preferred technical solution of the present invention, the height of the top surface of the inner straight wall of the air outlet passage is greater than that of the top surface of the inner inclined wall of the air outlet passage.

As a preferred technical solution of the present invention, a plurality of additional air inlets capable of forming constricted air inlets are longitudinally and equidistantly arranged on the photovoltaic modules.

As a preferred technical solution of the present invention, the distance between the adjacent additional air inlets is 5 m to 8 m.

As a preferred technical solution, the length of the additional air inlet is less than 0.1 m, the height of a port of the additional air inlet is 0.2 m to 0.4 m, and the ratio of height of the port of the additional air inlet to the width of the ventilation gap is 2.5 to 5.

As a preferred technical solution of the present invention, the bottom edge of the inner port of the additional air inlet is provided with a wind deflector inclined upward, the inclination angle of which is 20° to 70°.

As a preferred technical solution of the present invention, the photovoltaic module is any of a silicon solar module, a copper indium gallium selenide thin-film solar module, a cadmium telluride thin-film solar module, an organic photovoltaic thin-film solar module, a perovskite thin-film solar module, a dye-sensitized solar module, and an intrinsic heterojunction thin-film solar module.

The beneficial effects of the present invention are as follows:

According to the present invention, the air duct between the photovoltaic modules and the building wall is modified in a simple way, that is, the air inlet passage for forming the constricted air inlet and the air outlet chimney serving as the air outlet are inserted, and thereby, the natural convection in the ventilation gap can be accelerated to a high wind speed level similar to that of forced convection without requiring any mechanical fan device, enhancing the ventilation cooling of the BIPV modules without increasing power consumption; therefore, the high air speed along the ventilation gap can significantly improve the cooling performance of the BIPV modules and further increase their electricity yield; in addition, the improved ventilation structure of the present invention can be easily achieved without a lot of installation work, and the related fixed cost is far lower than that of the modification of a single solar panel, because the cost can be allocated to a large number of modules.

BRIEF DESCRIPTION OF DRAWINGS

FIG. 1(*b*) shows a bottom detail diagram of a standard BIPV installation facade without a ventilation gap;

FIG. 2(*b*) shows a bottom detail diagram of BIPV installed on a facade with a standard ventilation gap;

FIG. 3(*b*) shows a conventional metal plate structure additionally installed for the convection cooling of the back of solar modules;

FIG. 4(*b*) shows a bottom detail diagram of an embodiment installing BIPV on a facade in which ventilation is improved by using a constricted air inlet passage at the bottom of a building wall;

FIG. 5(*b*) shows a bottom detail diagram of an embodiment installing BIPV on a facade in which ventilation is improved by using a narrow air inlet passage at the bottom of a building wall and an air outlet chimney at the top;

FIG. 9(*b*) shows a detailed illustration of the circle highlighted in the macro diagram of the repeated BIPV cooling of a high-rise building with additional air inlets using small air inlet passages on different floors;

FIG. 10(*b*) shows another embodiments installing BIPV on a facade in which secondary constricted air inlet is improved for ventilation by using a constricted air inlet passage at the bottom of a building wall.

FIG. 11(*b*) shows another embodiments installing BIPV on a facade in which half-enlarged air outlet is improved for ventilation by using an air outlet chimney at the top of a building wall.

REFERENCE NUMERALS

Figure 1A:
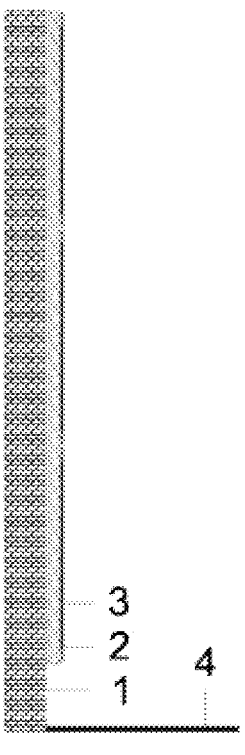
FIG. 1(*a*) shows a macro diagram of a standard BIPV installation facade without a ventilation gap.

1. Building wall; 2. Thermal insulation layer; 3. Photovoltaic module; 4. Ground; 5. Steel column; 6. Ventilation gap; 7. Airflow; 8. Air inlet passage; 9. Opening; 10. Air inlet grille; 11. Air outlet chimney; 12. Air outlet passage; 13. Support; 14. Chimney hood; 15. Additional air inlet; 16. Port; 17. Wind deflector.

DESCRIPTION OF EMBODIMENTS

In order to make the objective, technical solution and advantages of the present invention clearer, the present invention is further described in detail below in reference to embodiments. It should be understood that the specific embodiments described herein are only used to explain the present invention rather than to limit the present invention.

As shown in FIGS. 4(*a*), 4(*b*), 5(*a*) and 5(*b*), a novel ventilation structure for BIPV modules includes photovoltaic modules 3 matched with a building wall 1, the back of the photovoltaic modules 3 is installed on the facade of the building wall 1 in parallel through a plurality of steel columns 5, a ventilation gap 6 is formed between the photovoltaic modules 3 and the building wall 1, an air inlet passage 8 for forming a constricted air inlet is transversely inserted in the bottom of the ventilation gap 6, and an air outlet chimney 11 as an air outlet is longitudinally inserted in the top of the ventilation gap.

By adopting the aforementioned technical solution, the novel ventilation structure modifies the air duct between the photovoltaic modules 3 and the building wall 1 in a simple way, that is, the air inlet passage 8 for forming the constricted air inlet and the air outlet chimney 11 serving as the air outlet are inserted, and thereby, the natural convection in the ventilation gap 6 can be accelerated to a high wind speed level similar to that of forced convection without requiring any mechanical fan device, enhancing the ventilation cooling of the BIPV modules without increasing power consumption; therefore, the high air speed along the ventilation gap 6 can significantly improve the cooling performance of the BIPV modules and further increase their electricity yield; in addition, the improved ventilation structure can be easily achieved without a lot of installation work, and the related fixed cost is far lower than that of the modification of a single solar panel, because the cost can be allocated to a large number of modules.

The air inlet passage 8 cooperates with the ventilation gap 6 to construct a constricted air inlet, which can increase the volume flow rate of the air, effectively prevent the air from flowing around when facing the cladding of the building, and force most of the airflow 7 naturally entering the air inlet passage 8 to deflect towards the ventilation gap 6, so that the air speed in the ventilation gap 6 is high;

the airflow 7 in the air outlet chimney 11 is heated by the thermal effect of the sun, and since the warm air will naturally flow upwards, the warm air will "pull" the remaining airflow 7 in the ventilation gap 6; in this way, the air speed behind the top three solar panels of the photovoltaic module 3 can be increased; and therefore, the convective cooling performance in this area can be further enhanced.

As shown in FIG. 4(*a*) and FIG. 4(*b*), the length L of the top surface of the air inlet passage 8 is 0.5 m to 2 m, and the height H of an opening 9 of the air inlet passage 8 is 0.2 m to 0.8 m; the width of the ventilation gap 6 is less than 0.08 m, and the ratio of the height of the opening 9 of the air inlet passage 8 to the width of the ventilation gap 6 is 2.5 to 10.

By adopting the aforementioned technical solution, the ratio of the height of the opening 9 of the air inlet passage 8 to the width of the ventilation gap 6 should always be greater than 2.5, so as to construct a constricted air inlet. In the present invention, the ratio is set as 2.5 to 10; these values may be changed according to the structures of different BIPV modules, and the width of the opening 9 of the air inlet passage 8 may be changed proportionally according to the width of the facade of the building wall 1.

Figure 10A:
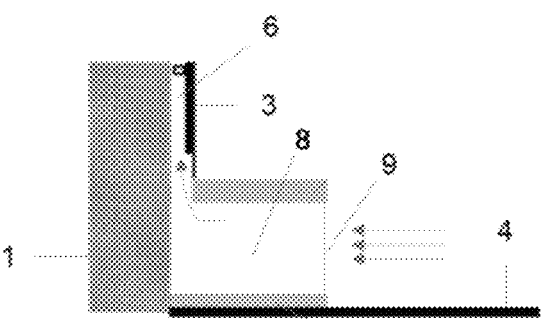
FIG. 10(*a*) shows another embodiments installing BIPV on a facade in which parallel air inlet is improved for ventilation by using a constricted air inlet passage at the bottom of a building wall.
Figure 10B:
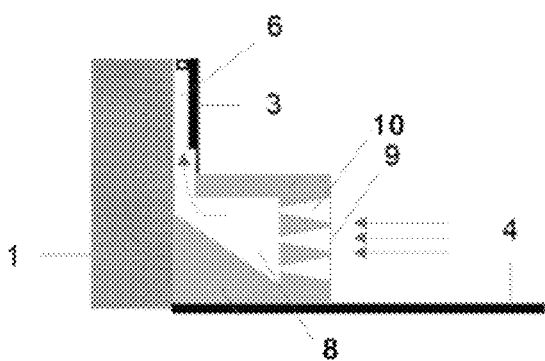

As shown in FIG. 10(*a*) and FIG. 10(*b*), the air inlet passage 8 is designed as a parallel structure.

By adopting the aforementioned technical solution, the air inlet passage 8 is provided with a parallel air inlet, so the structural design is simple and the manufacturing cost is low.

As shown in FIG. 4(*a*) and FIG. 4(*b*), the bottom surface of the air inlet passage 8 makes an included angle of 20° to 70° with the ground 4 at the bottom of the building wall 1.

By adopting the aforementioned technical solution, when the natural air enters the opening 9 of the constricted air inlet passage 8, the volume flow rate of the air will be increased several times according to the limited geometry. By adopting the constricted air inlet design, the air will be effectively prevented from flowing around when facing the cladding of the building, so that a larger part of the airflow 7 will be forced to deflect towards the ventilation gap 6. Therefore, the large airflow passing through the small inlet will lead to a much higher air speed in the ventilation gap 6, which can further improve the cooling performance of the BIPV modules.

As shown in FIG. 10(*a*) and FIG. 10(*b*), the end surface at the opening 9 of the air inlet passage 8 is sealed with an air inlet grille 10, which is provided with a plurality of through holes distributed in an array, and the longitudinal section of each through hole is of a flared structure and constricted inward.

By adopting the aforementioned technical solution, the arranged air inlet grille 10 with flared through holes can form a secondary constricted air inlet, so that the direction and speed of air flow can be further controlled, thus better improving the cooling performance of the BIPV modules.

Figure 11A:
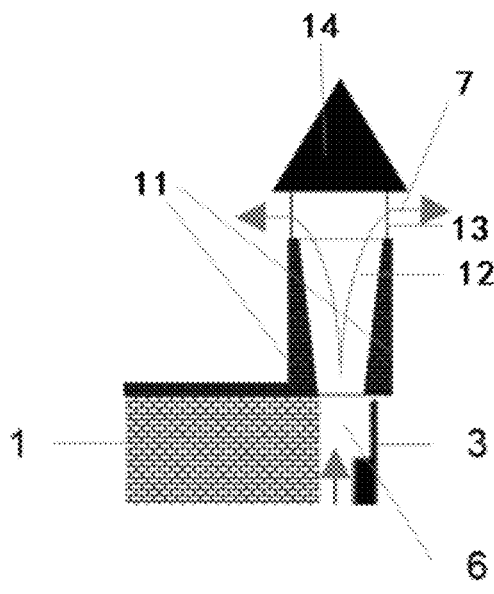
FIG. 11(*a*) shows another embodiments installing BIPV on a facade in which enlarged air outlet is improved for ventilation by using an air outlet chimney at the top of a building wall.
Figure 11B:
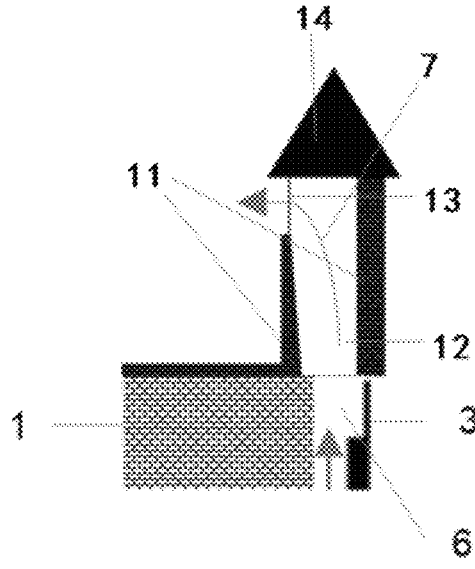

As shown in FIG. 11(*a*) and FIG. 11(*b*), an air outlet passage 12 of the air outlet chimney 11 adopts an enlarged air outlet design, and the longitudinal section of the air outlet passage 12 is of a flared structure and constricted inward.

By adopting the aforementioned technical solution, the air outlet passage 12 adopts an enlarged air outlet design, which can further enhance the "pulling" effect to increase the speed of the airflow 7, thus improving the cooling performance of the top area of the photovoltaic modules 3.

As shown in FIG. 11(*a*) and FIG. 11(*b*), the air outlet passage 12 of the air outlet chimney 11 adopts a half-enlarged air outlet design, and the longitudinal section of the air outlet passage 12 is of a half-flared structure and constricted inward.

By adopting the aforementioned technical solution, the air outlet passage 12 adopts the half-enlarged air outlet design and the aforementioned enlarged air outlet design which are all different due to the airflow 7, or adopts a gradually enlarged air outlet design, so that the "pulling" effect can be further enhanced to increase the speed of the airflow 7, thus improving the cooling performance of the top area of the photovoltaic modules 3.

As shown in FIGS. 5(*a*), 5(*b*), 11(*a*) and 11(*b*), a chimney hood 14 which is of a conical structure is suspended over the top opening of the air outlet passage 12 through supports 13.

By adopting the aforementioned technical solution, the chimney hood 14 is arranged into a conical structure in order to prevent fallen leaves from blocking the ventilation gap 6, so that fallen leaves, rain and snow can quickly slide down.

As shown in FIG. 11(*a*) and FIG. 11(*b*), the height of the top surface of the inner straight wall of the air outlet passage 12 is greater than that of the top surface of the inner inclined wall of the air outlet passage.

By adopting the aforementioned technical solution, this not only can unilaterally guide the airflow 7 in the air outlet passage 12 to further increase the speed of the airflow 7, but also can replace the support 13 on one side to play a supporting role.

As shown in FIG. 9(*a*) and FIG. 9(*b*), a plurality of additional air inlets 15 capable of forming constricted air inlets are longitudinally and equidistantly arranged on the photovoltaic modules 3.

Figure 7:
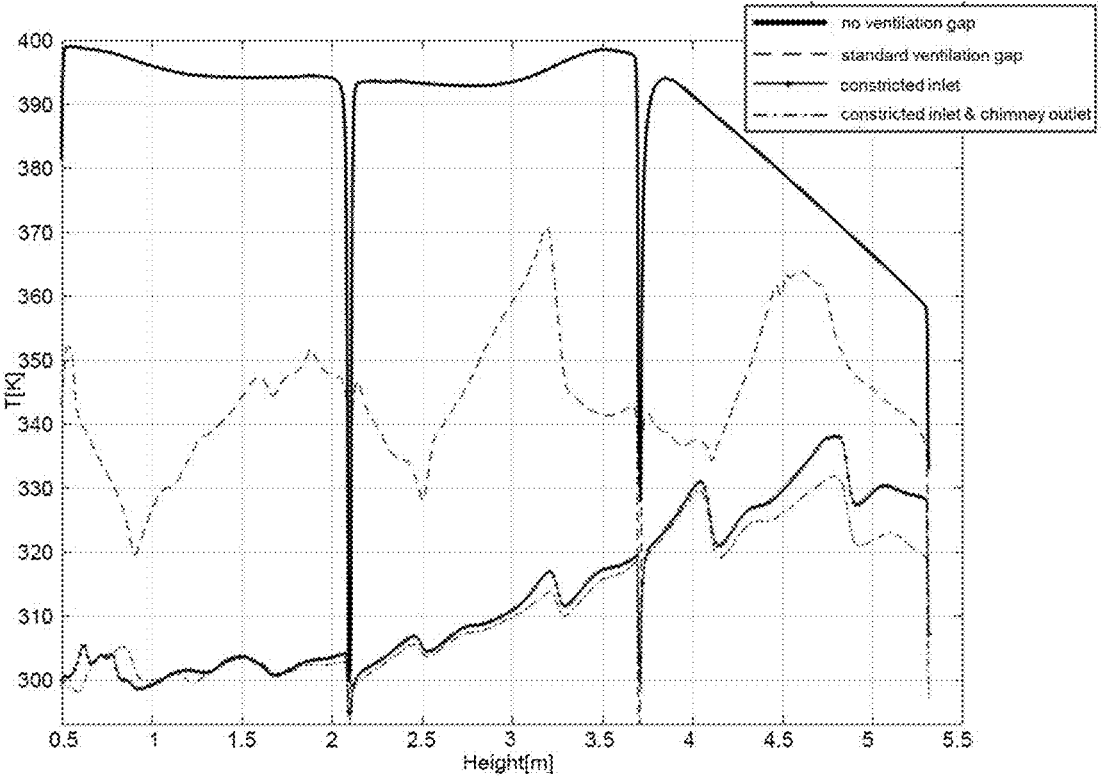
FIG. 7 shows that according to a simulation, the temperature of nine photovoltaic modules of different BIPV installations along a central axis increases with the increase of height.
Figure 8:
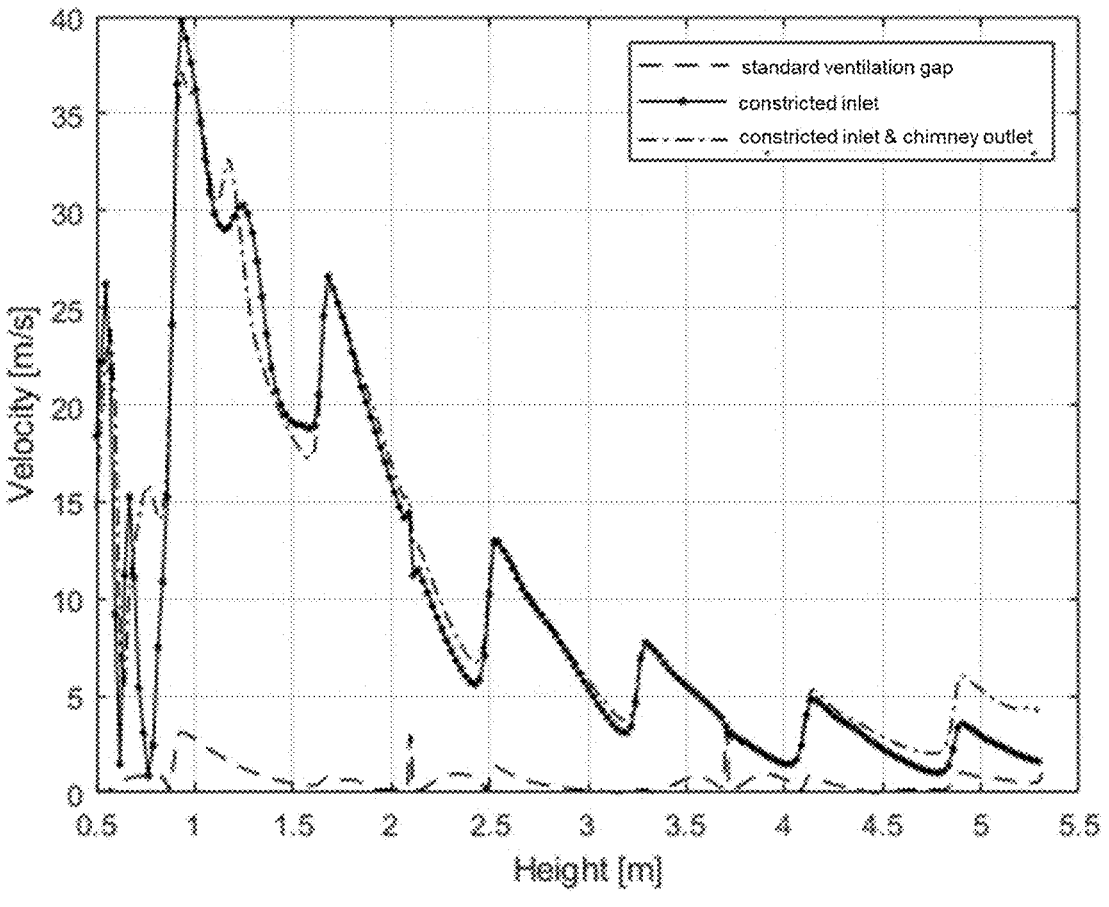
FIG. 8 shows the air speed in a ventilation gap along the central axis of the nine installed photovoltaic modules with the increase of height for the different BIPV installations according to the simulation.

By adopting the aforementioned technical solution, it can be seen from FIGS. 7 and 8 that the influence of convective cooling decreases with the increase of building height. Therefore, the ventilation temperature of the constricted air inlet of the air inlet passage 8 increases, and the related wind speed decreases. In order to solve this problem, additional air inlets 15 that can form constricted air inlets can be repeatedly installed between different floors, and these additional air inlets 15 can increase the air speed in the ventilation gap 6 by introducing more airflow, so as to enhance the cooling of the photovoltaic modules 3 installed on the higher floors of the building. It should be noted that all these new concept designs are not cost-intensive and do not require extra power consumption.

As shown in FIG. 9(*a*) and FIG. 9(*b*), the distance between the adjacent additional air inlets 15 is 5 m to 8 m.

By adopting the aforementioned technical solution, for the floors of a high-rise building, such installation can be repeated, e.g. arranging an additional air inlet 15 every 5 m to 8 m.

As shown in FIG. 9(*a*) and FIG. 9(*b*), the length of the additional air inlet 15 is less than 0.1 m, the height of a port 16 of the additional air inlet 15 is 0.2 m to 0.4 m, and the ratio of the height of the port 16 of the additional air inlet 15 to the width of the ventilation gap 6 is 2.5 to 5.

By adopting the aforementioned technical solution, the aforementioned data are the typical dimensions of the additional air inlet 15, which can form a small constricted air inlet to further increase the speed of the cooling air.

As shown in FIG. 9(*a*) and FIG. 9(*b*), the bottom edge of the inner port 16 of the additional air inlet 15 is provided with a wind deflector 17 inclined upward, the inclination angle of which is 20° to 70°.

By adopting the aforementioned technical solution, in order to force the additional airflow to move upwards, the air deflector 17 with an inclination angle of 20° to 70° is used; and because the junction of communication between the additional air inlet 15 and the ventilation gap 6 is half-open, the downstairs air can still flow upward.

As shown in FIG. 5(*a*) and FIG. 5(*b*), the photovoltaic module 3 is any of a silicon solar module, a copper indium gallium selenide thin-film solar module, a cadmium telluride thin-film solar module, an organic photovoltaic thin-film solar module, a perovskite thin-film solar module, a dye-sensitized solar module, and an intrinsic heterojunction thin-film solar module.

Figure 4A:
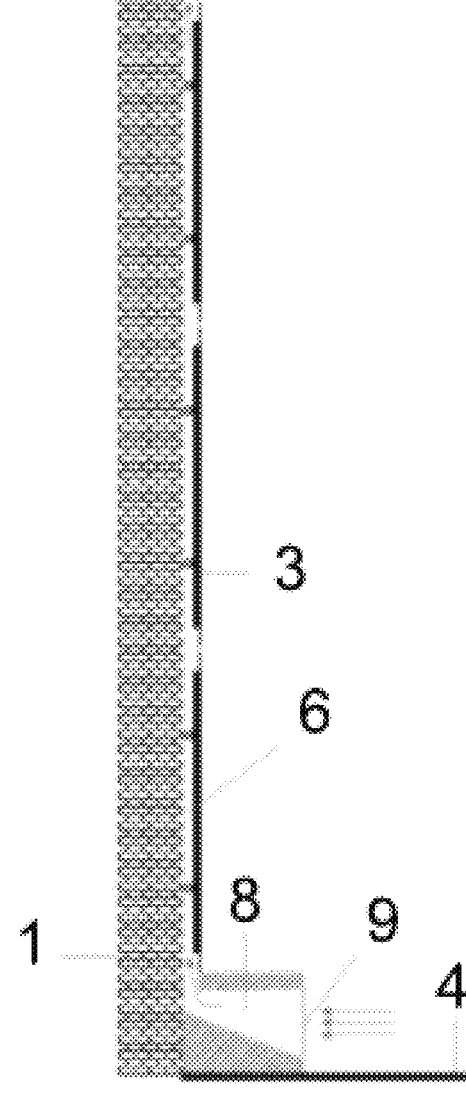
FIG. 4(*a*) shows a macro diagram of an embodiment installing BIPV on a facade in which ventilation is improved by using a constricted air inlet passage at the bottom of a building wall.
Figure 5A:
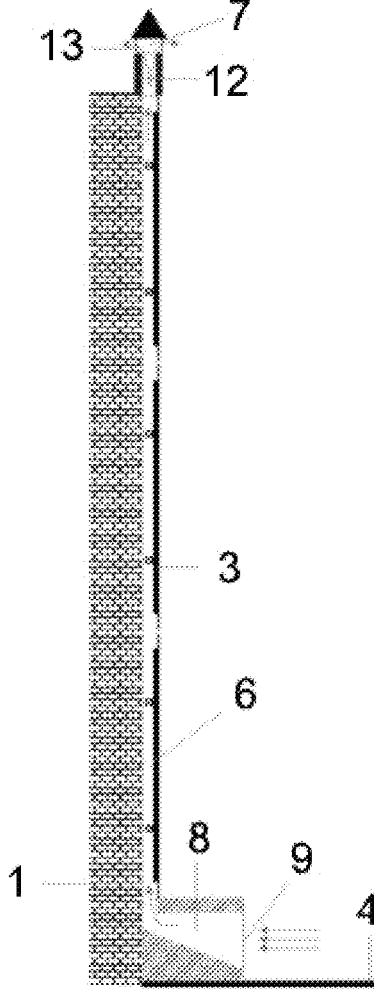
FIG. 5(*a*) shows a macro diagram of an embodiment installing BIPV on a facade in which ventilation is improved by using a narrow air inlet passage at the bottom of a building wall and an air outlet chimney at the top.
Figure 5B:
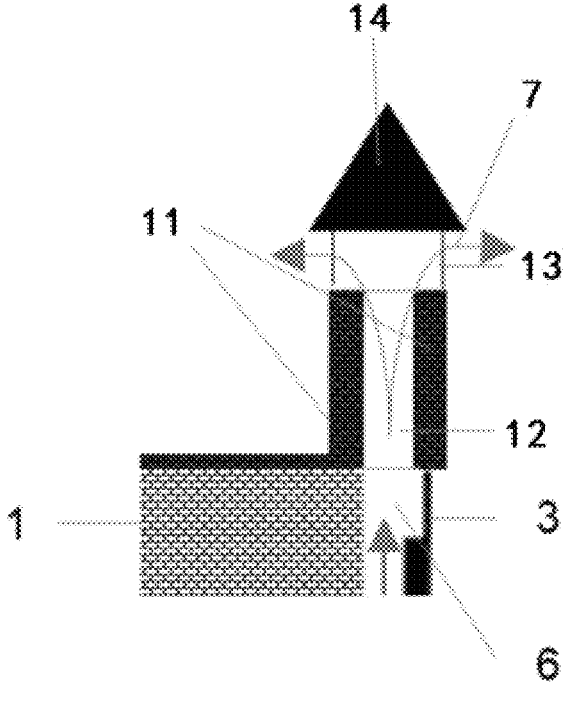
Figure 6:
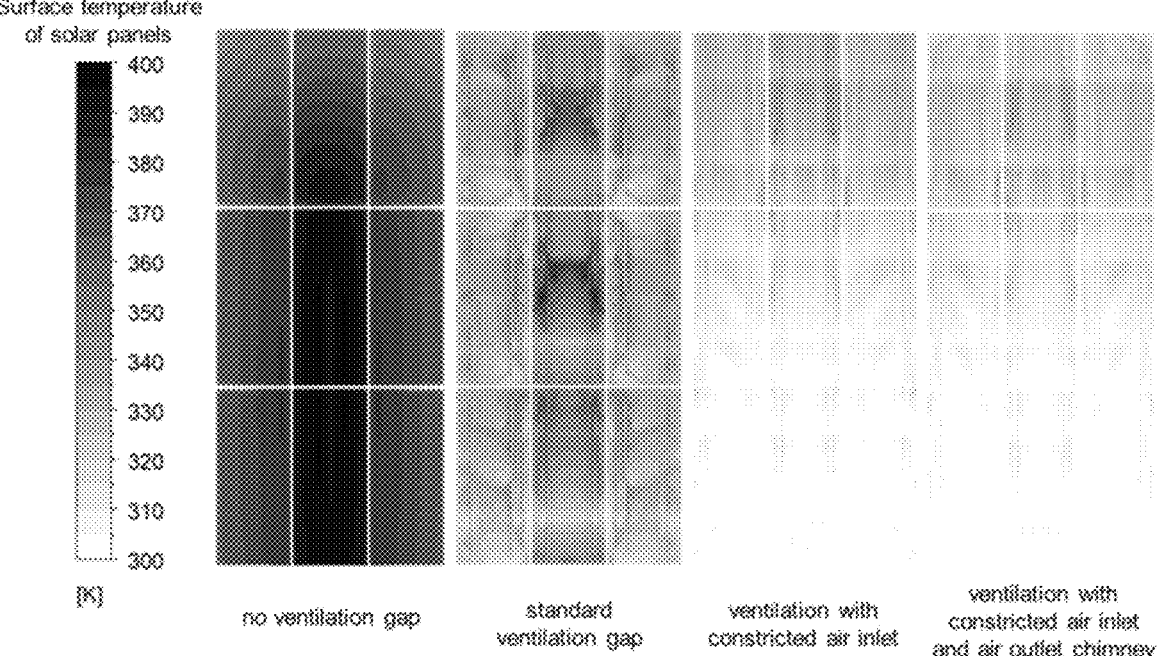
FIG. 6 shows the temperature distribution graph of different BIPV installations according to a simulation.

By adopting the aforementioned technical solution, it should be noted that all types of commercially available BIPV modules (such as various silicon solar modules, copper indium gallium selenide (CIGS) thin-film solar modules, cadmium telluride (CdTe) thin-film solar module, organic photovoltaic (OPV) thin-film solar modules, perovskite thin-film solar modules, dye-sensitized solar cells (DSSC) modules, and intrinsic heterojunction thin films (DSSC)) can adopt this new improved ventilation method. Related Test:

FIG. 6 shows the simulated mapping results of the temperature field of the BIPV panel using the constricted air inlet. Therefore, we set the simulated boundary conditions as follows: the ambient temperature was 20° C. (RT); the BIPV modules were standard black CIGS panels, with 3×3 standard CIGS BIPV modules (length: about 1.6 m; width: about 0.65 m) from the commercial market as a simulated matrix unit; and the speed of peripheral wind was 4 m/s (Beaufort wind scale 2: light breeze), and the peripheral wind was then guided into the ventilation structure; and the solar radiation was 1000 W/m$^2$ (the solar radiation in most parts of the earth is 700 W/m$^2$ to 1300 W/m$^2$ at noon on a sunny day). For most BIPV application cases, such boundary conditions should be representative. As shown in FIG. 6, the temperature field of the 3×3 PV module matrix using the constricted air inlets (FIG. 4(*a*) and FIG. 4(*b*)) was significantly reduced compared with that of the case of all the nine solar panels having no ventilation gap (FIG. 1(*a*) and FIG. 1(*b*)) and standard ventilation gap (see FIG. 2(*a*) and FIG. 2(*b*)) of. The temperature of only the top three panels was slightly higher than that of the other six panels. This indicated that the weakening effect of convective cooling could be released through high-speed air infiltration with the help of the constricted air inlets. However, this influence had not been completely eliminated. In order to further improve the cooling performance of the installed BIPV modules (particularly, the top three panels), an air outlet chimney 11 was added to the air outlet of the ventilation gap 6 (as shown in FIG. 5(*a*) and FIG. 5(*b*)).

Figure 1B:
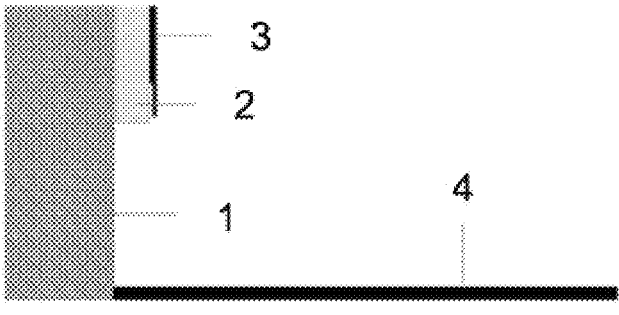
Figure 4B:
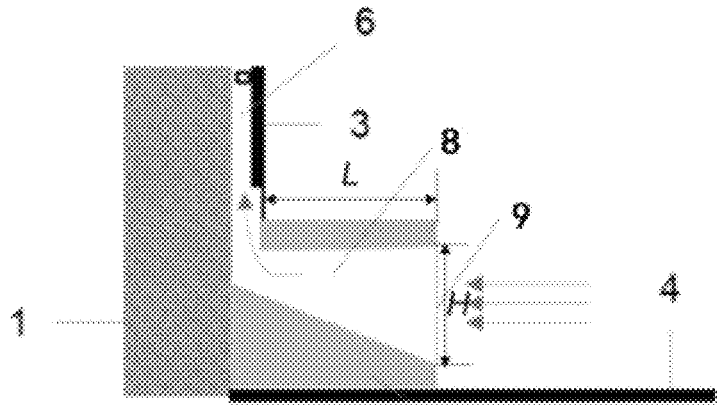

FIG. 7 shows that in all the four types of BIPV module installation configurations, i.e. no ventilation gap (FIG. 1(*a*) and FIG. 1(*b*)), the BIPV module installation configuration with the standard ventilation gap (see FIG. 2(*a*) and FIG. 2(*b*)), ventilation with constricted air inlet (FIG. 4(*a*) and FIG. 4(b)), and ventilation with constricted air inlet and air outlet chimney (FIG. 5(a) and FIG. 5(b)), the temperature of the installed solar panels along the central axis changed with the increase of building height, showing their temperature distributions more clearly and quantitatively. It should be noted that the temperature drops by about 2.1 m and about 3.7 m were caused by the installation gaps between the short front edges of the solar panels. It can be seen that compared with the standard ventilation gap design, the improved air ventilation concept using the constricted air inlets and the air outlet chimney could effectively reduce the temperature of the solar panels by 20 K to 50 K, that is, for CIGS solar modules (Tk=−0.35%/K), in this case, electricity yield could be appropriately increased by 8% to 20%. It can also be clearly seen that compared with the solar panels using only the constricted air inlets, the solar panels using the constricted air inlet and the air outlet chimney structure additionally enhanced the cooling (2 K to 10 K) of the top three solar panels.

Figure 2A:
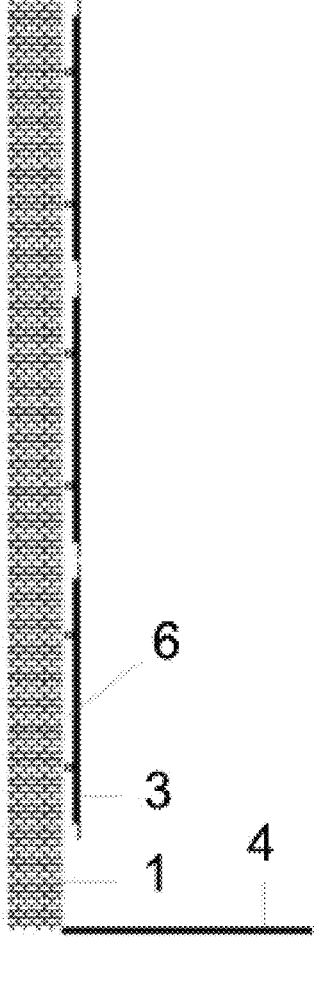
FIG. 2(*a*) shows a macro diagram of BIPV installed on a facade with a standard ventilation gap.
Figure 2B:
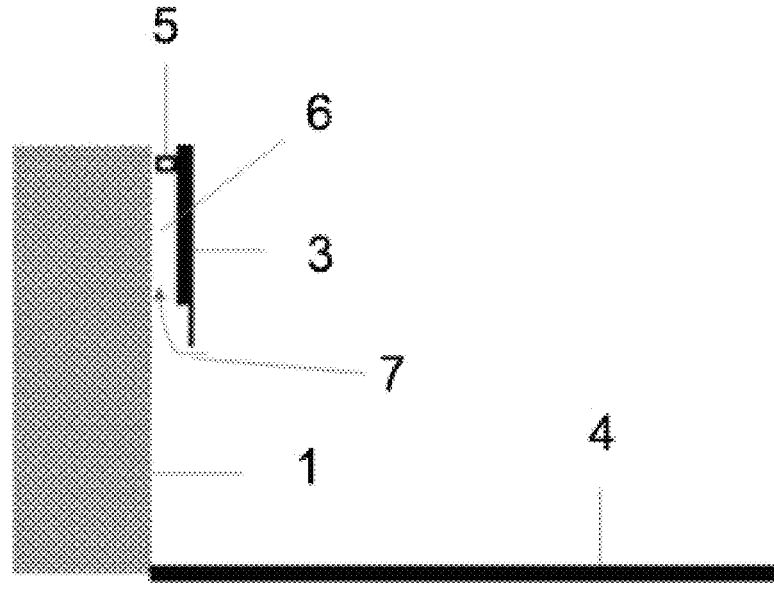
Figure 3A:
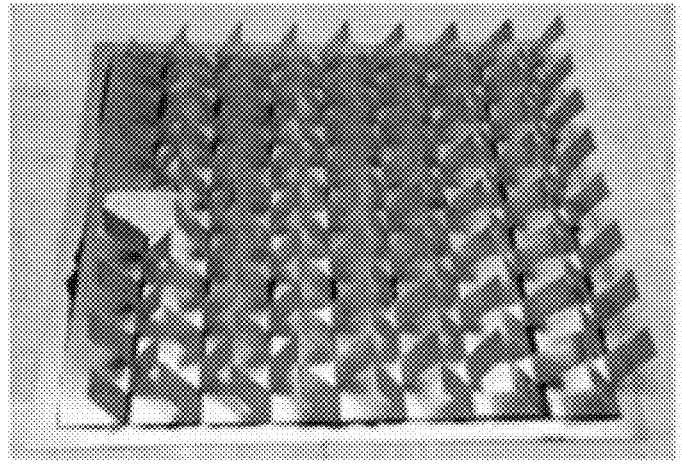
FIG. 3(*a*) shows a section additionally installed for the convection cooling of the back of solar modules.
Figure 3B:
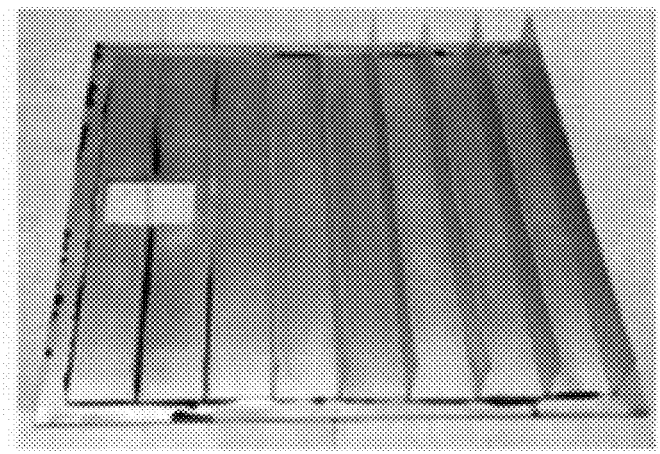

FIG. 8 shows the wind speed distributions of the solar panels installed according to the three types of BIPV module installation configurations, i.e. the BIPV module installation configuration with the standard ventilation gap (see FIG. 2(a) and FIG. 2(b)), ventilation with constricted air inlet (FIG. 4(a) and FIG. 4(b)), and ventilation with constricted air inlet and air outlet chimney (FIG. 5(a) and FIG. 5(b)), along the central axis, and the increase of building height. Compared with the standard ventilation gap design, the improved air ventilation concept adopting the constricted air inlets and the air outlet chimney could significantly increase the air speed behind the solar panels by 5 m/s to 47 m/s. Therefore, the convective cooling performance was effectively improved. In addition, compared with the solar panels among which the top three panels only used the constricted air inlets, the wind speed of the solar panels with the constricted air inlets and the air outlet chimney structure was increased by 1 m/s to 3 m/s.

Figure 9A:
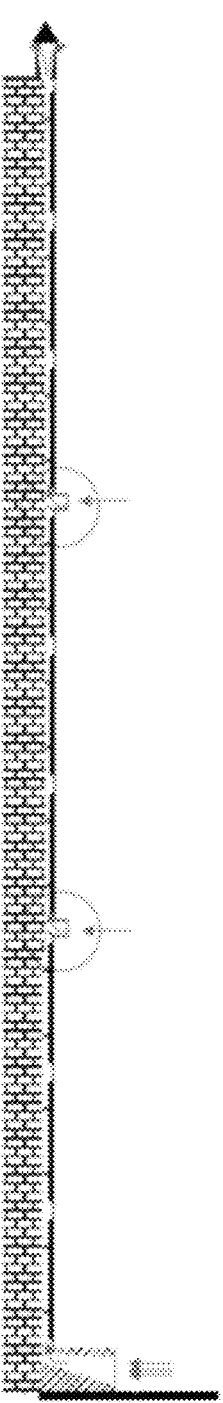
FIG. 9(*a*) shows a macro diagram of the repeated BIPV cooling of a high-rise building with additional air inlets using small air inlet passages on different floors.
Figure 9B:
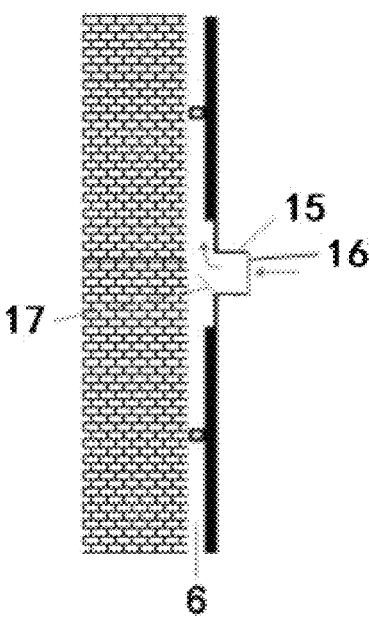

As shown in FIGS. 7 and 8, the influence of convective cooling decreased with the height of the building. Therefore, with the increase of the temperature of the BIPV module installation configuration with the constricted air inlets for ventilation, the related air speed decreased. In order to solve such problems, the configuration of the constricted air inlets, i.e. the additional air inlets 15 (as shown in FIG. 9(a) and FIG. 9(b)), can be set in the repetitive manner of the present invention.

What is described above is merely the preferred embodiment of the present invention, and is not used to limit the present invention, and any modifications, equivalent replacement, improvements and the like which are made within the spirit and principle of the present invention shall fall within the protection scope of the present invention.

What is claimed is:

1. A novel ventilation structure for building integrated photovoltaic (BIPV) modules, comprising photovoltaic modules matched with a building wall, an air inlet passage, and an air outlet chimney, wherein:

a back of the photovoltaic modules is installed on a facade of the building wall in parallel through a plurality of steel columns;

the photovoltaic modules and the building wall cooperatively define a ventilation gap, wherein the air inlet passage is disposed out of the ventilation gap and mounted to a bottom of the ventilation gap, the air outlet chimney is disposed out of the ventilation gap and mounted to a top of the ventilation gap, and the air inlet passage, the ventilation gap, and the air outlet chimney are in communication with one another to enable an airflow to flow through the air inlet passage, the ventilation gap, and the air outlet chimney in sequence; and a length L of a top surface of the air inlet passage is 0.5 m to 2 m, a height H of an opening of the air inlet passage is 0.2 m to 0.8 m, a width of the ventilation gap is less than 0.08 m, and a ratio of the height of the opening of the air inlet passage to the width of the ventilation gap is 2.5 to 10.

2. The novel ventilation structure for BIPV modules of claim 1, wherein a bottom surface of the air inlet passage makes an included angle of 20° to 70° with the ground at a bottom of the building wall.

3. The novel ventilation structure for BIPV modules of claim 2, wherein a end surface at the opening of the air inlet passage is sealed with an air inlet grille, which is provided with a plurality of through holes distributed in an array, and a longitudinal section of each through hole is of a flared structure and constricted inward.

4. The novel ventilation structure for BIPV modules of claim 2, wherein a plurality of additional air inlets capable of forming constricted air inlets are longitudinally and equidistantly arranged on the photovoltaic modules.

5. The novel ventilation structure for BIPV modules of claim 4, wherein a length of the additional air inlet is less than 0.1 m, a height of a port of the additional air inlet is 0.2 m to 0.4 m, and the ratio of a height of the port of the additional air inlet to the width of the ventilation gap is 2.5 to 5.

6. The novel ventilation structure for BIPV modules of claim 4, wherein a bottom edge of an inner port of the additional air inlet is provided with a wind deflector inclined upward, a inclination angle of which is 20° to 70°.

7. The novel ventilation structure for BIPV modules of claim 1, wherein an air outlet passage of the air outlet chimney adopts an enlarged air outlet design, and a longitudinal section of the air outlet passage is of a flared structure and constricted inward.

8. The novel ventilation structure for BIPV modules of claim 7, wherein a chimney hood which is of a conical structure is suspended over a top opening of the air outlet passage through supports.

9. The novel ventilation structure for BIPV modules of claim 1, wherein the air outlet passage of the air outlet chimney adopts a half-enlarged air outlet design, and a longitudinal section of the air outlet passage is of a half-flared structure and constricted inward.

10. The novel ventilation structure for BIPV modules of claim 9, wherein a chimney hood which is of a conical structure is suspended over a top opening of the air outlet passage through supports.

11. The novel ventilation structure for BIPV modules of claim 9, wherein the air outlet passage has an inner straight wall and an inner inclined wall opposite the inner straight wall, wherein the inner inclined wall is closer to the building wall than the inner straight wall, and a height of the inner straight wall is greater than the inner inclined wall.

12. The novel ventilation structure for BIPV modules of claim 11, wherein a distance between any adjacent two additional air inlets among the plurality of additional air inlets is 5 m to 8 m.

13. The novel ventilation structure for BIPV modules of claim 1, wherein each of the photovoltaic modules is any of a silicon solar module, a copper indium gallium selenide thin-film solar module, a cadmium telluride thin-film solar module, an organic photovoltaic thin-film solar module, a perovskite thin-film solar module, a dye-sensitized solar module, and an intrinsic heterojunction thin-film solar module.

14. The novel ventilation structure for BIPV modules of claim 1, wherein the air inlet passage is mounted to both the building wall and the ventilation gap during ventilation, and the air outlet chimney is mounted to both the building wall and the ventilation gap during ventilation.

15. The novel ventilation structure for BIPV modules of claim 1, wherein the air inlet passage extends in a direction substantially perpendicular to a direction in which the ventilation gap extends, and the air outlet chimney extends in a direction substantially parallel to the direction in which the ventilation gap extends.

16. The novel ventilation structure for BIPV modules of claim 1, wherein the building wall is fixed to the ground, and the air inlet passage is placed on the ground.

* * * * *